A. I. DU PONT.
GATE OPENING APPARATUS.
APPLICATION FILED FEB. 13, 1917.
1,246,567.
Patented Nov. 13, 1917.
2 SHEETS—SHEET 2.
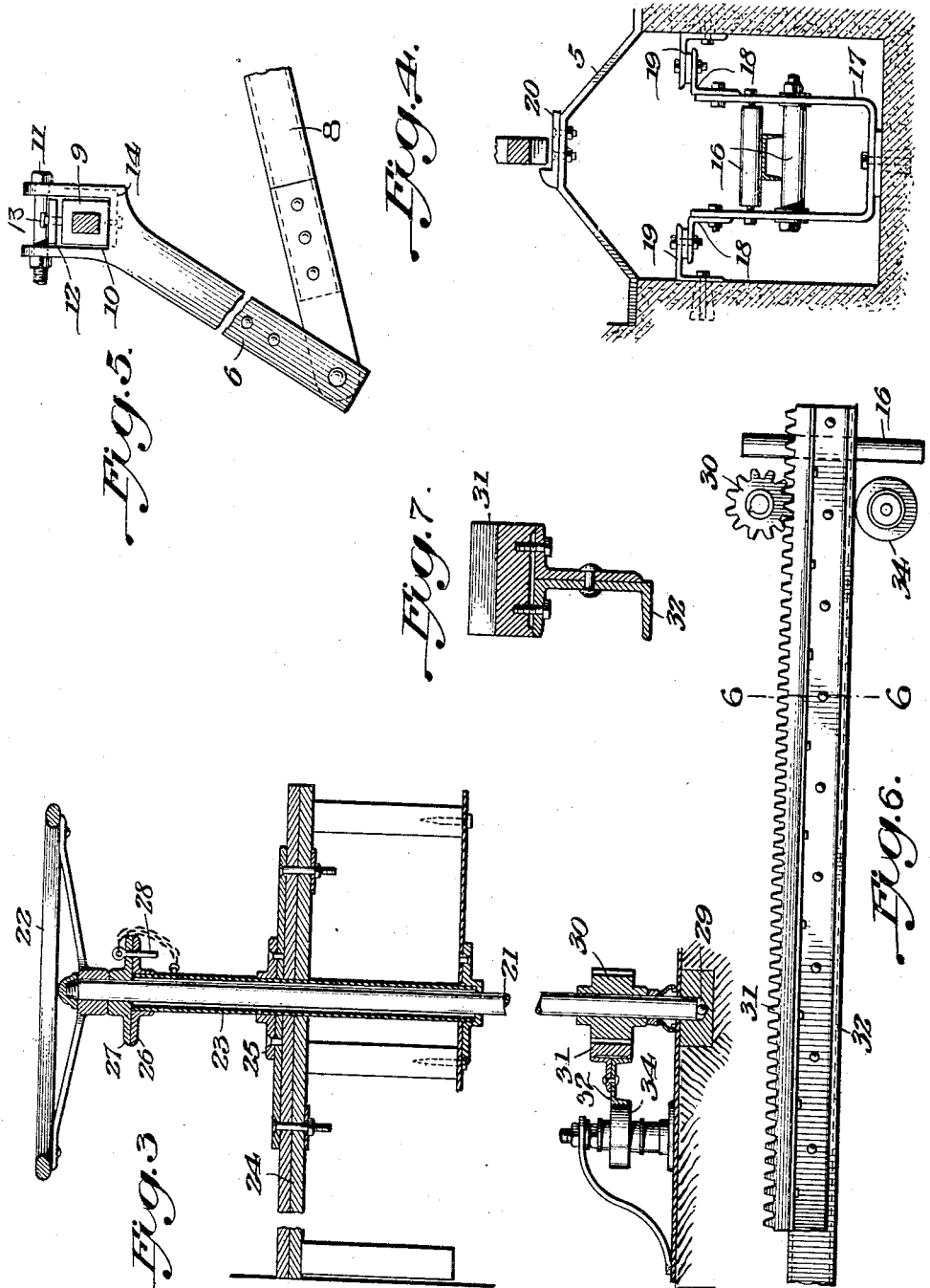

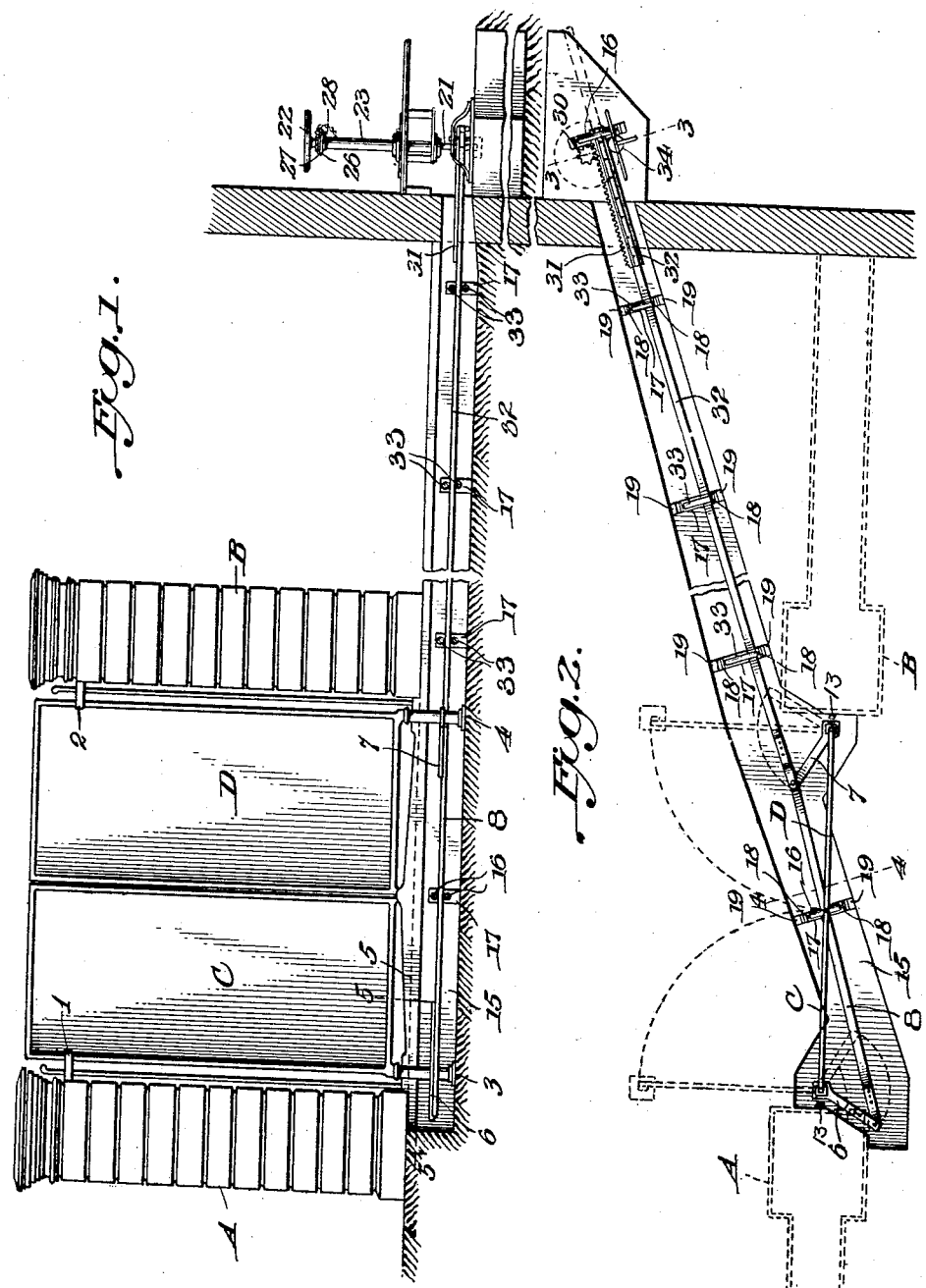

UNITED STATES PATENT OFFICE.

ALFRED I. du PONT, OF WILMINGTON, DELAWARE.

GATE-OPENING APPARATUS.

1,246,567.  Specification of Letters Patent.  Patented Nov. 13, 1917.

Application filed February 13, 1917. Serial No. 148,397.

*To all whom it may concern:*

Be it known that ALFRED I. DU PONT, a citizen of the United States, residing at Wilmington, in county of New Castle and State of Delaware, have invented certain new and useful Improvements in Gate-Opening Apparatus, of which the following is a specification.

This invention pertains to a gate opening apparatus, and the object is to construct the apparatus in such a manner that a pair of gates will be opened automatically and simultaneously from a distant point. The several actuating parts being arranged in such a manner as to simplify as much as possible the construction of the apparatus necessary to accomplish the above.

Figure 1 is an elevation of the gate and actuating mechanism, certain portions thereof shown in section.

Fig. 2 is a top plan view of the same.

Fig. 3 is a transverse vertical section on line 3, 3, of Fig. 2, showing the actuating mechanism.

Fig. 4 is a transverse vertical section on line 4, 4, of Fig. 2.

Fig. 5 is an enlarged horizontal section on line 5, 5, of Fig. 1, showing the means for detaching the arm of the gate post.

Fig. 6 is an enlarged detail view of the pinion and rack, and

Fig. 7 is a transverse section thereof on lines 7, 7, of Fig. 6.

A and B, represent stationary gate posts to which are pivotally hinged a pair of gates C and D. These gates are suitably hinged at the top to brackets 1 and 2 supported by the posts, and at the bottom by downwardly extending pivots 3 and 4, which extend through a base plate 5, as disclosed in Fig. 1. Actuating arms 6 and 7 project laterally from the base portion of the pivots preferably in opposite directions and are connected together by a suitable connecting rod 8. These arms are connected to a collar 9, which is preferably provided with a square opening which is adapted to receive the square bottom portion of the pivot posts 3 and 4. The arms are provided with an open slot 10 which surrounds the square collar 9, after which a bolt 11 is passed transversely through the open end of the slot. Interposed between the bolt 11 and collar 9 is a clamping plate 12, which is provided with a set screw 13, which is adapted to bear against the square collar and force the plate against the bolt 11, thereby securely fastening together the arm of the square collar. A suitable angle plate 14 is arranged on the square collar 9 to suitably support the same while adjusting it to the square collar. This actuating mechanism is preferably arranged below the ground line in a suitable trench 15. In view of the fact that the pivotal points of the gates are a suitable distance apart the connecting rod 8, which is connected to the outer ends of the arms 6 and 7, is provided with suitable supporting rollers 16, 16, which are arranged transversely of the rod and are rotatably supported in a substantially U-shaped frame 17. This frame is supported at the bottom, having its upper ends connected to angle plates 18, 18, which are supported in turn by suitable brackets 19, 19, extending laterally from the wall portions of the trench. This trench, as aforesaid, is covered by a base 5, which is provided centrally thereof with a suitable stop 20, for limiting the movement of the gates C and D inwardly.

The mechanism for actuating the gates is preferably at a distance therefrom, and is constructed as follows:

21 indicates a vertically arranged shaft which is provided at its upper end with a hand-wheel 22, which is keyed to the shaft. This shaft 21 is carried by a shell 23, which is supported upon a floor 24, being secured thereto by collar 25. The upper end of the shell is provided with a smaller collar 26 which engages a collar 27 keyed to the shaft 21. A pin 28 is adapted to register with openings in the collars 26 and 27 to act as a lock for the gate in its open or closed position. A suitable thrust bearing 29 is provided with the shaft 21 at the base thereof. Keyed to the shaft 21 is a pinion 30 which is adapted to mesh with a rack 31. This rack 31 is secured to angle-iron 32, one end of which is pivotally connected to the arm 7 secured to one of the gate posts. The angle iron 32 is supported in a manner similar to the rod 8, that is to say, by suitable sets of rollers 33 which are arranged at intervals transversely of the angle irons. These rollers serve to prevent the angle irons from buckling when being moved in one direction and yet permit of the lateral movement necessary for the arm 7 to describe an arc when being actuated. The rack is held in mesh with the pinion 30 by guide rollers 34 vertically supported directly in the rear of the pinion 30 as disclosed in Fig. 3. This angle iron and the supporting rollers are likewise arranged in the trench leading from the gate to the actuating mechanism. It is to be observed that the actuating mechanism is arranged at such an angle as to bring the center line of travel of the angle iron 32 and the rod 8 substantially in horizontal alinement as disclosed in Fig. 2. Extreme lateral movement of the angle iron 32 and the connecting rod 8 is also shown in dotted lines in Fig. 2.

I have shown this mechanism as being operated manually, however, I do not wish to be limited to this specific means of actuation, as mechanism might readily be operated by compressed air or electricity. From the foregoing it will be seen that I have arranged the actuating mechanism in such a manner as to reduce all unnecessary strain in the operation of the device, and have provided such apparatus as will operate most efficiently.

I claim:

1. The combination of oppositely-disposed pivoted gates, pivots extending below said gates, and arranged within a trench thereneath, arms extending laterally from said pivots and in opposite directions to the common plane of the gates, a rod connected to the outer ends of the arms, an actuating-bar connected to one end of said rod, means for actuating the bar, whereby the gates are simultaneously opened and closed, and a stop arranged on the roof of said trench and centrally of said gates to limit the movement of the gates in one direction.

2. The combination of oppositely-disposed pivoted gates, pivots extending below said gates and arranged within a trench thereneath, collars received on the lower ends of said pivots, arms detachably connected thereto, said arms adapted to extend in opposite directions to the common plane of the gates, a rod connecting the outer free ends of said arms, an actuating-bar connected to one end of said arms, a plurality of sets of rolls supporting said arm and bar to permit of a lateral movement thereof, means connected with the outer end of the bar for actuating the same, whereby the gates are simultaneously opened and closed, and a stop arranged on the roof of said trench and centrally of said gates to limit the movement of the gates in one direction.

3. The combination of oppositely-disposed pivoted gates, pivots extending below said gates and arranged within a trench thereneath, collars received on the lower ends of said pivots, arms detachably connected thereto, said arms adapted to extend in opposite directions to the common plane of the gates, a rod connecting the outer free ends of said arms, an actuating bar connected to one end of said arms, a rack-bar mounted upon the outer free end and at the side of said actuating bar, a vertically-arranged shaft having a pinion on the lower end thereof adapted to mesh with the rack-bar, a collar adjacent to said pinion which is adapted to keep the pinion and rack in mesh, a plurality of sets of rollers supporting said rods and bar in such a manner as to permit lateral movement, means for actuating the vertically-arranged shaft, whereby the gates are simultaneously opened and closed, and a stop arranged on the roof of said trench and centrally of said gates to limit the movement of the gates in one direction.

In testimony whereof I affix my signature, in the presence of two witnesses.

ALFRED I. du PONT.

Witnesses:
 RUTH BRERETON,
 ALICE M. PETERS.

Copies of this patent may be obtained for five cents each, by addressing the "Commissioner of Patents Washington, D. C."